June 20, 1939. F. POSTLETHWAITE 2,163,518
TELEMETRIC SYSTEM USING ELECTRICAL RESISTANCE
Filed Sept. 9, 1936
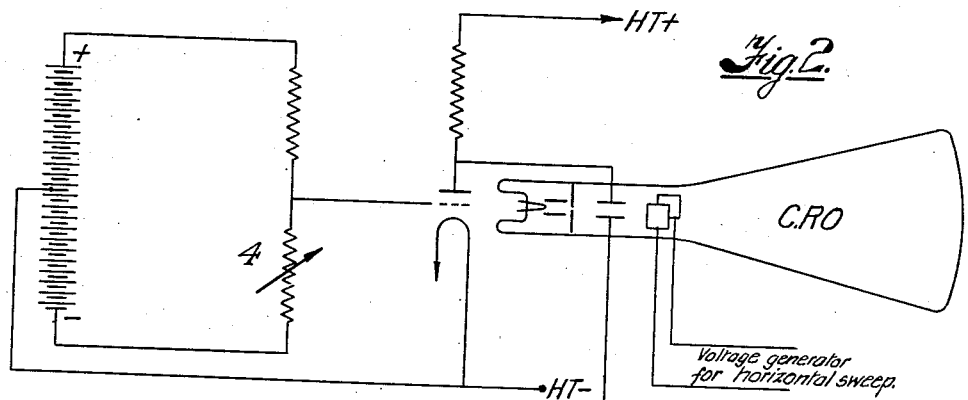
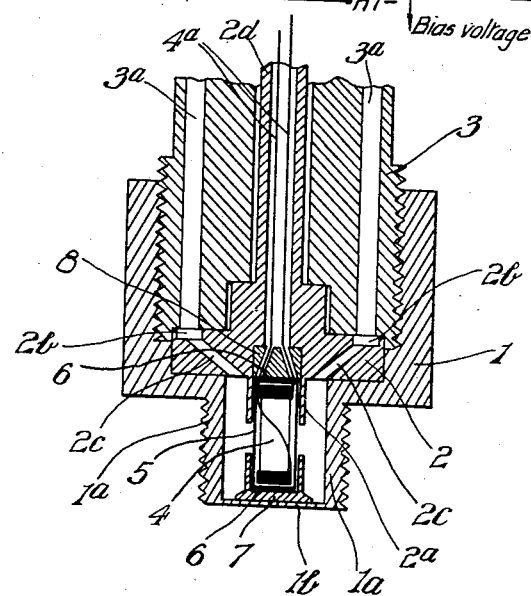
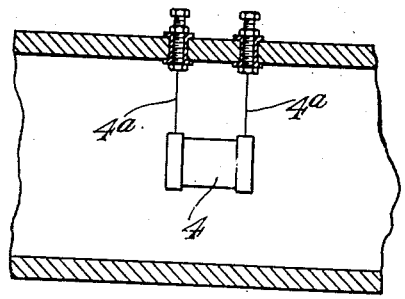
INVENTOR
FRANK POSTLETHWAITE
By Norris & Bateman
ATTORNEYS Patented June 20, 1939

2,163,518

UNITED STATES PATENT OFFICE 2,163,518

TELEMETRIC SYSTEM USING ELECTRICAL RESISTANCE

Frank Postlethwaite, Farnborough, England

Application September 9, 1936, Serial No. 99,998
In Great Britain September 11, 1935

5 Claims. (Cl. 177—351)

This invention relates to electrical apparatus for indicating pressure. The invention is more particularly intended to be employed as an engine indicator but it may be employed for indicating stress or pressure for other purposes.

In this invention a carbon composition resistance material is employed, such as is used to provide high resistances. This material is usually composed of finely divided carbon and siliceous material fused and bonded together.

The invention is based upon the discovery that such carbon composition resistance material varies in resistivity in accordance with mechanical pressures to which it is subjected. The resistance variation is found to be extremely rapid and conveniently sensitive, with a stability such as to give a good constancy of calibration to instruments which make use of this property.

It is preferred to use a carbon composition resistance having as high a rigidity as possible. Preferably the modulus of rigidity should be at least $8 \times 10^6$ lbs. per sq. inch. An element of such material having the dimensions 1/4" diameter and 5/8" length will respond to axial pressure variations having frequencies above 30,000 cycles per second without introducing inaccuracies due to the natural frequency vibration of the material. If the pressures are applied as fluid pressures to the whole surface of the resistance element still higher frequency response may be obtained without the occurrence of such trouble.

According to the invention, the variations of resistivity of a body of carbon composition resistance material due to changes of pressure are utilised to control an electrical device such as an oscillograph for indicating the pressure changes.

According to one aspect, the invention comprises the method of obtaining indications of variations of fluid pressure in a chamber which consists in arranging within the chamber a carbon composition pressure-variable resistance element, and in connecting thereto electrical apparatus arranged externally of the chamber to give indications according to different instantaneous values of the resistance of the element.

According to another aspect of the invention, a pressure indicating instrument comprises a carbon composition pressure-variable resistance element so supported as to be compressed in accordance with bending of a flexible wall upon which are borne the pressures which it is desired to indicate, and comprises means to make electrical connections to said element for the purpose of indicating variations in its resistance.

According to a further aspect, the invention comprises a chamber to contain fluid, the instantaneous pressures of which it is desired to indicate, said chamber being provided with a flexible portion in its wall and in combination with and externally of said chamber, a carbon composition pressure-variable resistance element is arranged to be compressed in accordance with bending of the flexible portion of the wall in response to pressure changes of the fluid, and means are provided to give indications according to different instantaneous values of the resistance of said element.

According to a further aspect of the invention, a pressure-indicating oscillograph is arranged for deflections in one direction under control of a time base generator and in the other direction in accordance with variations in resistance of a carbon composition pressure-variable resistance element.

It is important to avoid the introduction of errors due to contact resistances; the ends of the carbon composition resistance elements are, therefore, metal sprayed or electro-plated and connecting leads are soldered thereto.

The invention is illustrated in the accompanying drawing in which:

Figure 1 is a sectional view showing the mounting of a resistance element intended to serve as an engine indicator, Figure 2 is a diagram of an arrangement of an indicating apparatus and Figure 3 shows a method of mounting a resistance element for volumetric compression.

A convenient embodiment of the invention intended to serve as an engine indicator, is shown in Figs. 1 and 2. A steel body 1 (Fig. 1) has a form similar to that of the body of the customary sparking plug used in internal combustion engines. The male threaded extension 1a is intended to be screwed into a threaded hole similar to a sparking plug hole, communicating with the interior of an engine cylinder or other vessel containing a fluid, the pressure of which is to be indicated, or alternatively into a similar hole in an apparatus so arranged that a linear thrust to be indicated is applied in the direction along the axis of the body extension 1a. Across the end of the extension 1a is a thin flexible wall 1b upon which the pressure to be measured is thus arranged to bear.

At the back of the body extension 1a is a rigid steel plate 2 firmly secured against a shoulder in the body member 1 by a threaded cylinder 3, which is screwed into the body member 1 to bear against the plate 2.

Between the plate 2 and the thin flexible wall 1b, the carbon composition pressure-variable resistance element 4 is supported, in a casing which comprises a cylinder 5 of insulating material such as ebonite, and end plates 6 also of insulating material, for example, of synthetic resin moulded material, these insulating members being in turn encased within a steel cap 7, which actually bears against the flexible wall 1b, a cylindrical projection 2a extending from the plate 2, and a steel packing piece 8. The axial lengths of the parts enclosed within the body extension 1a are all accurately adjusted so that a light pressure is produced upon the resistance elements 4 where the plate 2 is secured in place against the shoulder in the body 1. It will be evident that any increase of fluid pressure upon the exterior of the flexible wall 1b, or alternatively any axial thrust upon this wall, will produce an increase in the pressure applied to the resistance element 4; and that in this way, owing to the property above mentioned, the resistance of this element will be varied.

In order to obtain indications of the resistance of the element, connection leads 4a from the ends of the resistance element are carried through holes in the packing piece 8, the plate 2 and its tubular extension 2d and are arranged for connection in an exterior electrical circuit.

It is desirable to provide means for controlling the temperature of the resistance element, and for this purpose a fluid circulation system is provided. Holes 3a parallel to the axis are provided in the cylinder 3 and these communicate with the annular groove 2b formed in the back of the plate 2. Holes 2c lead from the groove 2b into the space inside the body extension 1a.

The groove 2b is blocked by pins, not shown, at two diametrically opposed points, so that circulating fluid supplied through one of the holes 3a is fed through one of the holes 2c to the space around the resistance element 4, and is led away by the other holes 2c, 3a.

In order to obtain indications of rapidly varying pressures upon the flexible wall 1b, it is convenient to connect the wires 4a in such manner that variations of the resistance of element 4 are shown upon a cathode ray oscillograph. In order to obtain this effect it is convenient to connect the leads 4a in series with a fixed resistance across a D. C. source, and then to apply to the input of an amplifier the voltage appearing across leads 4a (see Fig. 2). The output of the amplifier is then applied to one pair of deflecting plates of a cathode ray oscillograph CRO while the time base voltage is applied to the other pair of deflecting plates. It is found that for the purpose of indicating pressures in engine cylinders a single stage of amplification is normally all that is required between leads 4a and the oscillograph plate, as a pressure of 30 lbs. on a resistance element ¼ inch in diameter will produce about one per cent change in resistance.

In an engine indicator the time base voltage may be arranged by methods known per se to be proportional either to piston displacement or to crank angle.

When it is desired to obtain indications of fluid pressure variations by the method of subjecting the resistance element to these actual fluid pressure variations, the resistance element 4 may be suspended by its connecting leads 4a in any part of the chamber in which the fluid is contained, for example, in a conduit through which the fluid flows (Figure 3). This arrangement, however, is applicable only where the fluid is electrically non-conducting.

I claim:

1. Apparatus for obtaining indications of variations of fluid pressure within a chamber, comprising a rigid molded pressure-variable carbon composition resistance element within said chamber, said resistance element having a resistivity which is variable in response to and in accordance with high frequency pressure variations and having terminal contacts which have relatively negligible resistance variation with contact pressure, and electrical means arranged exteriorly of said chamber and connected to said terminal contacts and operative to give indications according to different instantaneous values of the resistance of said element.

2. In combination with a chamber to contain a fluid the instantaneous pressure of which is to be indicated, said chamber having a wall provided with a flexible portion, a rigid molded carbon composition pressure-variable resistance element arranged to be compressed linearly in accordance with bending of the flexible portion of said wall in response to pressure changes of the fluid, said resistance element having a resistivity which is variable in response to and in accordance with high frequency pressure variations, terminal contacts for said resistance element substantially free of resistance variation with contact pressure, and means connected to said terminal contacts and operative to give indications according to different instantaneous values of the resistance of said element.

3. A pressure indicating instrument comprising a flexible wall for the transmission of pressures to be indicated, a rigid molded carbon composition pressure-variable resistance element the resistivity of which is variable in response to and in accordance with high frequency pressure variations, said element being supported for compression linearly by the bending of said flexible wall, terminal contacts for making electrical connections to said element substantially free of resistance variation with contact pressure, and an indicator connected to said terminal contacts and responsive to variations in resistance of said resistance element.

4. Apparatus for indicating variations in rapidly varying pressures, comprising a rigid molded carbon composition pressure-variable resistance element subject to the rapidly varying pressures, the resistivity of said resistance element being variable in response to and in accordance with such rapidly varying pressures; terminal contacts for said element substantially free of resistance variation with contact pressure, and an oscillograph electrically connected to said terminal contacts.

5. A pressure indicating instrument comprising a body member having a male threaded extension, a backing plate secured rigidly within said member immediately behind said extension, said extension having a flexible wall formed across the front thereof through which pressures to be indicated may be transmitted, a rigid molded carbon composition pressure-variable resistance element firmly held between said backing plate and said flexible wall for compression linearly, the resistivity of said resistance element being variable in response to and in accordance with high frequency pressure variations, terminal contacts for making electrical connections to said element substantially free of resistance variation with contact pressure, and an indicator connected to said terminal contacts and responsive to variations in resistance of said resistance element.

FRANK POSTLETHWAITE.